(12) United States Patent
Crapp et al.

(10) Patent No.: US 7,831,546 B2
(45) Date of Patent: Nov. 9, 2010

(54) SYSTEM AND METHOD FOR INTELLIGENT SCRIPT SWAPPING

(75) Inventors: Daniel R. Crapp, Madison, WI (US); Paul L. Hansen, McFarland, WI (US); Raymond M. Jalbert, Jefferson, WI (US); Wayne P. Waldner, Richland Center, WI (US)

(73) Assignee: American TEL-A-Systems, Inc., McFarland, WI (US)

( * ) Notice: Subject to any disclaimer, the term of this patent is extended or adjusted under 35 U.S.C. 154(b) by 382 days.

(21) Appl. No.: 11/961,616

(22) Filed: Dec. 20, 2007

(65) Prior Publication Data
US 2008/0097973 A1 Apr. 24, 2008

Related U.S. Application Data

(62) Division of application No. 10/672,723, filed on Sep. 26, 2003, now Pat. No. 7,359,918.

(51) Int. Cl.
*G06F 7/00* (2006.01)
*G06F 17/00* (2006.01)
*G06F 17/30* (2006.01)

(52) U.S. Cl. .................. 707/603; 707/766
(58) Field of Classification Search .......... 707/603, 707/766
See application file for complete search history.

(56) References Cited

U.S. PATENT DOCUMENTS

| | | | |
|---|---|---|---|
| 5,001,710 A | 3/1991 | Gawrys et al. | 370/110.1 |
| 5,164,981 A | 11/1992 | Mitchell et al. | 379/88 |
| 5,179,585 A | 1/1993 | MacMillan, Jr. et al. | 379/88 |
| 5,479,487 A | 12/1995 | Hammond | 379/67 |
| 5,533,115 A | 7/1996 | Hollenbach et al. | 379/220 |
| 5,555,299 A | 9/1996 | Maloney et al. | 379/212 |
| 5,619,557 A | 4/1997 | Van Berkum | 379/88 |
| 5,621,789 A | 4/1997 | McCalmont et al. | 379/265 |
| 5,854,837 A | 12/1998 | Trader et al. | 379/265 |
| 5,870,464 A | 2/1999 | Brewster et al. | 379/219 |
| 5,884,032 A | 3/1999 | Bateman et al. | 395/200.34 |
| 6,141,413 A | 10/2000 | Waldner et al. | 379/265 |
| 6,311,231 B1 | 10/2001 | Bateman et al. | 710/5 |
| 6,385,646 B1 | 5/2002 | Brown et al. | 709/217 |

(Continued)

OTHER PUBLICATIONS

Barra, "Cooperative and Adaptive Systems on the WWW", Thesis, Dottorato di Ricerca in Informatica, Universit_a di Salerno, pp. 1-99, Nov. 2001.*

(Continued)

*Primary Examiner*—Neveen Abel Jalil
*Assistant Examiner*—Michael J Hicks
(74) *Attorney, Agent, or Firm*—Baker Botts L.L.P.

(57) ABSTRACT

A method for providing data collection from a client at a data collection mechanism, the method includes collecting from a first client a first portion of data using a first data collection mechanism using at least a portion of a first script comprising one or more queries for information to the first client. The method also includes associating with a second client the first portion of data that was collected from the first client. The method further includes collecting from the second client a second portion of data using at least some of the first portion of data and a second script comprising one or more queries for information to the second client.

20 Claims, 5 Drawing Sheets

U.S. PATENT DOCUMENTS

| | | | | |
|---|---|---|---|---|
| 6,430,285 | B1 | 8/2002 | Bauer et al. | 379/265.01 |
| 6,463,149 | B1 | 10/2002 | Jolissaint et al. | 379/265.09 |
| 6,480,601 | B1 | 11/2002 | McLaughlin | 379/265.11 |
| 6,504,914 | B1 | 1/2003 | Brademann et al. | 379/88.16 |
| 6,510,220 | B1 | 1/2003 | Beckett, II et al. | 379/265.06 |
| 6,654,447 | B1 | 11/2003 | Dewan | 379/76 |
| 7,197,132 | B2 * | 3/2007 | Dezonno et al. | 379/265.07 |
| 2003/0002651 | A1 | 1/2003 | Shires | 379/265.01 |
| 2003/0092976 | A1 | 5/2003 | Murase et al. | 600/300 |
| 2004/0161078 | A1 | 8/2004 | Knott et al. | 379/88.22 |

OTHER PUBLICATIONS

Reips et al., "WEXTOR: A Web-based tool for generating and visualizing experimental designs and procedures," Behavior Research Methods, Instrument and Computers, 24(s), pp. 234-240, 2002.

Feinberg et al., "Designing and Developing Surveys on WWW Sites," Proceedings of the 16th International Conference on Computer Documentation, ACM, Sep. 1996.

Crapp et al., "System and Method for Intelligent Script Swapping," U.S. Appl. No. 10/672,723, currently pending, 59 pages, Sep. 26, 2003.

* cited by examiner

302a — Q: Welcome to XYZ Company's interactive operating system. Please respond to the following questions by speaking your response. At any time during the call you can request to speak with an agent by either pressing "0" followed by the "#" key or saying "operator." Are you calling to place a new order?
304a — A: Yes
302b — Q: Do you have the fall 2003 XYZ Company catalog?
304b — A: Yes
302c — Q: Do you have an existing account with XYZ Company?
304c — A: No
302d — Q: Would you like to establish an account with XYZ Company?
304d — A: Yes
302e — Q: Please provide your credit card number?
304e — A: 0000 0000 1234 5678
302f — Q: Please provide the type of credit card?
304f — A: Operator

332a — Q: Please provide your credit card number?
334a — A: 0000 0000 1234 5678 0000 0000 5678 1234
336 ⟶ Q: Please provide the type of credit card?
334b — A: Visa
332c — Q: Please provide the expiration date  332b
     A: 01/04
334c ⟶ Q: Your new XYZ Co. account number is
332d    123456789. Would you like to continue
        with your order?
     A: Yes
334d ⟶ Q: Please hold while I transfer you back to the
332e    automated system.

FIG. 3B

FIG. 3C 350
352a Q: Please provide the catalog number for the first item you want to order?
354a A: 12345
352b Q: How many blue shirts would you like to order?
354b A: One
352c Q: Would you like to order another item at this time?
354c A: Yes
...
352n Q: Thank you for placing your order with XYZ Co.

START

510 — COLLECT A FIRST PORTION OF DATA AT A FIRST DATA COLLECTION MECHANISM USING AT LEAST A PORTION OF A FIRST SCRIPT HAVING ONE OR MORE QUERIES FOR INFORMATION

520 — ASSOCIATE THE CLIENT WITH A SECOND DATA COLLECTION MECHANISM BASED AT LEAST IN PART ON AN EVENT ASSOCIATED WITH THE CLIENT'S INTERACTION WITH THE FIRST DATA COLLECTION MECHANISM

530 — AFTER ASSOCIATING THE CLIENT WITH THE SECOND DATA COLLECTION MECHANISM, COLLECT A SECOND PORTION OF DATA FROM THE CLIENT

END

452a — Q: When would you like to pick up your prescription?
454a — A: ~~Tomorrow~~ Today
452b — Q: What time would you like your prescription to be available?
454b — A: 11:30 a.m.
 Q: Prescription number 12345-6789 will be ready for — 452c
456   pick up at 11:30 a.m. today. Would you like to pay in advance for your prescription using your credit card.
454c — A: Yes
452d — Q: What is your credit card number
454d — A: 0000 0000 1234 5678
452e — Q: When does the card expire
454e — A: 01/04
452f — Q: Thank you. A charge of $20.00 will be posted to credit card number 0000 0000 1234 5678 and your prescription will be available at the drive-thru window at the time and date you requested.

*FIG. 4B*

SYSTEM AND METHOD FOR INTELLIGENT SCRIPT SWAPPING

RELATED APPLICATIONS

This application is a divisional of and claims priority to U.S. Ser. No. 10/672,723, by Daniel R. Crapp et al., filed Sep. 26, 2003, entitled "A System and Method for Intelligent Script Swapping."

TECHNICAL FIELD OF THE INVENTION

This invention relates in general to the field of data collection systems and more particularly to a system and method for providing data collection from a client at a data collection mechanism.

OVERVIEW

Data collection mechanisms used in communication systems are typically used to collect information from one or more users of the data collection mechanism. Typically, data collection systems employ automated data collection mechanisms to collect information from a user as an alternative to live operators, agents, or users. Conventional automated data collection mechanisms are, in some cases, incapable of completely collecting the necessary information without assistance from a live operator, agent, or user.

SUMMARY OF EXAMPLE EMBODIMENTS

In one embodiment, a method for providing data collection from a client at a data collection mechanism comprises collecting from a client a first portion of data using a first data collection mechanism using at least a portion of a first script comprising one or more queries for information to the client. The method also comprises associating the client with a second data collection mechanism based at least in part on an event associated with the client's interaction with the first data collection mechanism. The method continues after associating the client with the second data collection mechanism, by collecting from the client a second portion of data using a second script. In one particular embodiment, the second script comprises at least one query for information not yet presented to the client by the first script.

In another embodiment, a method for providing data collection from a client at a first data collection mechanism comprises collecting from a client a first portion of data using a first data collection mechanism using at least a portion of a first script comprising one or more queries for information to the client. The method also comprises associating the client with a second data collection mechanism based at least in part on an event associated with the client's interaction with the first data collection mechanism. This method then continues by collecting from the client a second portion of data using a second script. In one particular embodiment, the first portion of data and the second portion of data are stored in a common memory accessible to the first and second data collection mechanisms.

In yet another embodiment, a method for providing data collection from a client at a data collection mechanism comprises collecting from a client a first portion of data using a first data collection mechanism using at least a portion of a first script comprising one or more queries for information to the client. The method also comprises associating the client with a second data collection mechanism based at least in part on an event associated with the client's interaction with the first data collection mechanism. This method then continues by collecting a second portion of data from the client. In one particular embodiment, the second portion of data comprises a plurality of answers of the client in response to one or more queries of the second data collection mechanism. The method further comprises associating the client and at least some of the second portion of data to the first data collection mechanism with facilitate collection of a third portion of data using the first script.

In another embodiment, a method for providing data collection from a client at a data collection mechanism comprises collecting from a first client a first portion of data using a first data collection mechanism using at least a portion of a first script comprising one or more queries for information to the first client. The method also comprises associating the first portion of data with a second client. The method then continues by collecting from the second client a second portion of data using a second script comprising one or more queries for information to the second client.

Depending on the specific features implemented, particular embodiments of the present invention may exhibit some, none, or all of the following technical advantages. For example, various embodiments may be capable of facilitating integration of a plurality of data collection mechanisms in the communication system. Some embodiments may be capable of improving the efficiency of a user or agent of a data collection mechanism.

Other technical advantages will be readily apparent to one skilled in the art from the following figures, description and claims. Moreover, while specific advantages have been enumerated, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF EXAMPLE EMBODIMENTS

Figure 1:
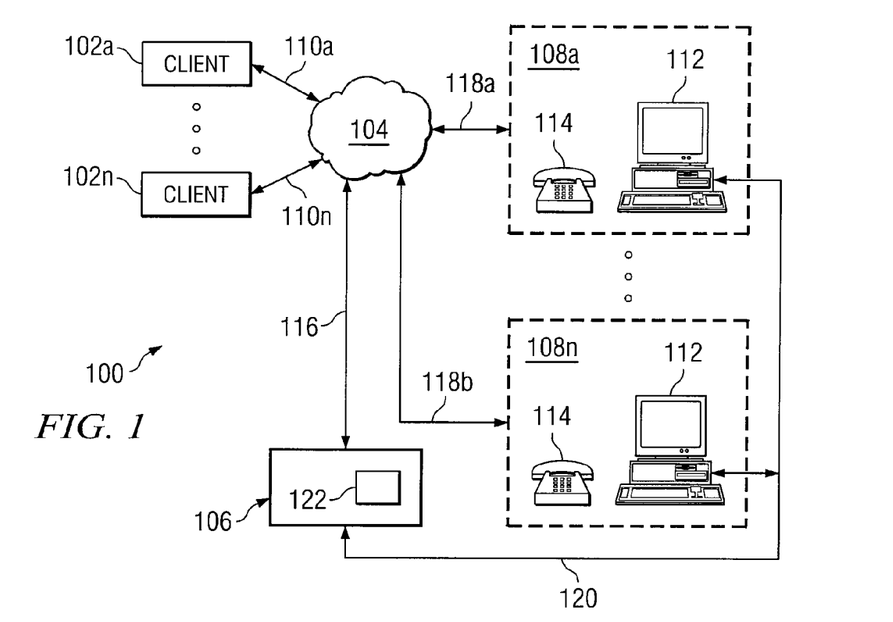
FIG. 1 is a block diagram of one embodiment of a communication system capable of collecting data from one or more users of the system.

FIG. 1 is a block diagram of one embodiment of a communication system 100 capable of collecting data from one or more users of system 100. FIG. 1 illustrates just one example embodiment of system 100. It should be appreciated that other embodiments of system 100 may be used without departing from the scope of the present disclosure. In this example, system 100 includes a first data collection mechanism 106 capable of performing a desired communicating and/or computing functionality. As non-limiting examples, first mechanism could comprise an interactive voice response system (IVR), an interactive web-based system, an agent-based system, or a combination of these or other data communication systems. First mechanism 106 may comprise any device or combination of devices that may include one or more software and/or firmware modules. In various embodiments, first mechanism 106 could comprise, for example, a speech recognition module, one or more memory modules, and one or more software engines.

In this embodiment, first mechanism 106 executes one or more scripts 122. As used throughout this document, the term "script" refers to a routine that is capable of facilitating presentation of one or more queries to collect data from one or more clients. In one particular non-limiting example, script 122 can comprise a series of queries requesting information and/or data from a user of first mechanism 106. In some cases, scripts 122 may include, for example, an IVR script, an HTML-based script, an XML-based script, or a combination of these or other scripting formats. Scripts 122 may comprise, for example, software, firmware, code, portions of code, data compilations, and/or a combination of these or any other type of data.

In one particular embodiment, first mechanism 106 receives and/or communicates data through a network 104 coupled to first mechanism 106. As used throughout this document, the term "couple" and/or "coupled" refers to any direct or indirect communication between two or more elements, whether or not those elements are in physical contact with one another. In this example, first mechanism 106 couples to network 104 through communications link 116. In other embodiments, first mechanism 106 operates to collect, store, and/or communicate data to and/or from network 104.

Network 104 may comprise any wireless network, wireline network, or combination of wireless and wireline networks capable of supporting communication between network elements using ground-based and/or space-based components. For example, network 104 may comprise a data network, a public switched telephone network (PSTN), an integrated services digital network (ISDN), a local area network (LAN), a wide area network (WAN), a metropolitan area network (MAN), all or a portion of the global computer network known as the Internet, and/or other communication systems or combination of communication systems at one or more locations.

In this example, system 100 also includes one or more second data collection mechanisms 108 coupled to network 104 through communications link 118. Each second mechanism 108 is capable of performing a desired communicating and/or computing functionality. Second mechanism 108 may comprise any computing and/or communicating device or combination of devices. As non-limiting examples, second mechanism 108 could comprise an interactive voice response system (IVR), an interactive web-based system, an agent-based system, or a combination these or other data communication systems. In some embodiments, second mechanism 108 is capable of receiving, collecting, storing, and/or communicating data to and/or from network 104. In other embodiments, one or more second mechanisms 108 could comprise a data collection mechanism that is substantially similar to first mechanism 106.

One or more clients 102a-102n may couple to network 104 through communications link 110. Each client 102 may include any computing and/or communication device capable of enabling the communication of information to or from one or more data collection mechanisms over network 104. In some embodiments, clients 102a-102n enable a user of system 100 to communicate and/or receive data to and/or from first mechanism 106 and/or second mechanism 108. Each client 102 may include, for example, a telephone, a wireless device, a voice over IP device, a desktop computer, a laptop computer, a personal digital assistant, a workstation, a main-frame computer, a mini-frame computer, a web server, or any other computing and/or communicating device.

In this particular embodiment, a user of client 102 initiates the data collection process by using a computing and/or communication device, such as a telephone, to connect to first mechanism 106. In an alternative embodiment, first mechanism 106 and/or second mechanism 108 can initiate the data collection process with client 102. In this example, after initiation of the process, first mechanism 106 executes an IVR script that enables first mechanism 106 to interact with and collect data from client 102. Although first mechanism 106 executes an IVR script in this example, any other script may be executed by first mechanism 106 without departing from the scope of the present disclosure.

First mechanism 106 interacts with the user of client 102 by requesting that the user of client 102 respond to a series of queries associated with the IVR script. In some embodiments, the user of client 102 can respond by keying digits on a touch-tone keypad, a keyboard, and/or any other device capable of inputting a response that is comprehensible to client 102. In this particular embodiment, the user of client 102 responds to each of the series of queries by "speaking" a response to each query associated with the IVR script. In this example, first mechanism 106 includes a speech recognition module capable of processing voice responses, text-to-speech translations, and/or speech-to-text translations. In this example, first mechanism 106 stores each response in a memory device accessible to mechanism 106. In some cases, the user of client 102 will interact with first mechanism 106 until all data has been collected from the user of client 102.

In some cases, however, first mechanism 106 may be unable to continue interacting with the user of client 102 due to an event associated with the interaction of the user of client 102 and mechanism 106. The event may comprise, for example, the user of client 102 not responding within a given time period, the user of client 102 inputting an inappropriate response to a query the user of client 102 requesting assistance, or any other event that may indicate that the user of client 102 needs assistance. In those cases, the user of client 102 is associated to one of second mechanisms 108. In various embodiments, after occurrence of the event, first mechanism 106 can generate an agent assistance signal and can communicate that signal to one of second mechanisms 108. Second mechanism 108 attempts to gather additional information from client 102 while avoiding any additional occurrence of the event that caused the client to be associated with second mechanism 108.

In this particular embodiment, each second mechanism 108 comprises a live agent based data collection system capable of collecting data from clients 102. Although second mechanism 108 is an agent based system in this example, any data collection system may be used without departing from the scope of the present disclosure. For example, second mechanism 108 may include a more sophisticated IVR system that includes artificial intelligence that may handle a greater set of circumstances than first mechanism 106.

In this example, each second mechanism 108 includes a host 112 capable of executing and/or displaying one or more scripts that at least partially contribute to the collection of data from the user of client 102. Host 112 may include a graphical user interface (GUI) that enables a live agent to collect, enter, process, store, retrieve, amend, and/or dispatch data during the interaction of second mechanism 108 with the user of client 102. Host 112 may comprise, for example, a desktop computer, a laptop computer, a server computer, a personal digital assistant, and/or any other computing or communicating device or combination of devices. In some cases, the script executed by host 112 may include, for example, an HTML-based script, an XML-based script, a VML-based script, or a combination of these or other scripting formats. In one particular embodiment, script 122 and the script executed by host 112 are generated from a common script stored in a memory accessible to first mechanism 106 and second mechanism 108.

In this particular embodiment, each second mechanism 108 also includes a communication device 114 that enables an agent to communicate with client 102. Communication device 114 may comprise, for example, a telephone, a wireless device, a voice over IP device, or any other computing and/or communicating device or combination of devices. Although this example depicts host 112 and communication device 114 as separate devices, one device that is capable of performing the desired functionality could be used without departing from the scope of the present disclosure.

In this embodiment, second mechanism 108 operates to collect data from the user of client 102 using host 112 and communication device 114. This data collection could occur, for example, after first data collection mechanism 106 collects data from client 102. In this particular example, host 112 executes and displays an HTML-based script that enables a live agent to process, collect, enter, and/or store the data received from the user of client 102 through communication device 114. Although second mechanism 108 executes an HTML-based script in this example, any other script may be executed by second mechanism 108 without departing from the scope of the present disclosure. In various embodiments, the queries associated with the HTML-based script executed and displayed by host 112 can be substantially similar to at least some of the queries associated with script 122 executed by first mechanism 106. That is, one or more queries associated with the script displayed by host 112 can be directed toward collecting the same or similar information collected using script 122. In some embodiments, the scripts executed by first mechanism 106 and by second mechanism 108 can be identical. In one particular example, the queries executed and/or displayed on host 112 may include at least one query for data that has not yet been presented to client 102 by first mechanism 106 during the current session with client 102.

In certain cases, it may be desirable to include in the HTML script displayed on host 112 at least some of the responses that the user of client 102 gave to queries presented by first mechanism 106. In this example, some or all of the data collected and stored by first mechanism 106 is associated with second mechanism 108 through a communications link 120. In other embodiments, the data collected and stored by first mechanism 106 can be associated with second mechanism 108 through network 104. In this particular embodiment, at least some of the data collected by first mechanism 106 is used to populate at least a portion of the HTML script displayed on host 112. As used in this document, the term "populate" refers to the correlation of a client's response to queries presented by a mechanism. Populating the previously presented queries in the HTML script used by an agent can advantageously assist the agent in the collection of data from the user of client 102. In an alternative embodiment, the HTML can include other user information stored in a memory accessible to first mechanism 106 and second mechanism 108. For example, the HTML script can include a user's account number, a user's credit card information, or any other information previously collected about that user.

In this particular embodiment, an agent using second mechanism 108 interacts with the user of client 102 by requesting that the user of client 102 respond to one or more queries associated with the HTML script. In this particular embodiment, the user of client 102 speaks a response to the one or more queries associated with the HTML script. The user of client 102 can respond in any of several options, for example, by speaking the response, keying digits on a touch-tone keypad, and/or keying digits on a keyboard coupled to client 102. In some cases, the agent using second mechanism 108 asks at least the query previously presented by first mechanism 106 and at least one query not presented by the first mechanism 106 during the current session. After the presentation of the query or queries to the user of client 102, the user's responses and/or other data are stored on host 112.

In this example, second mechanism 108 communicates the data collected and/or stored by second mechanism 108 through communications link 120 to a memory accessible to first mechanism 106. In other embodiments, the data collected by second mechanism 108 can be associated with first mechanism 106 through network 104 or another communication link. In some embodiments, the data collected by second mechanism 108 can be stored in the same memory as the memory that stores data collected by first mechanism 106. Storing the collected data in a common memory can be useful in facilitating later retrieval and use of that data.

In some cases, the user of client 102 will interact with the agent associated with second mechanism 108 until the remaining data has been collected from the user. In various embodiments, second mechanism 108 can associate the user of client 102 with another one of second mechanisms 108 or back with first mechanism 106. In this particular embodiment, second mechanism 108 associates the user of client 102 back with first mechanism 106 to collect another portion of data from the user of client 102 using the IVR script associated with first mechanism 106.

In the illustrated embodiment, system 100 includes at least a first communications link 110, a second communications link 116, and a third communications link 118 each operable to facilitate the communication of data to and/or from network 104. Communications links 110, 116, and 118 may include any hardware, software, firmware, or combination thereof. In various embodiments, communications links 110, 116, and 118 may comprise communications media capable of assisting in the communication of analog and/or digital signals. Communications links 110, 116, and 118 may, for example, comprise a twisted-pair copper telephone line, a fiber optic line, a Digital Subscriber Line (DSL), a wireless link, a USB bus, a PCI bus, an ethernet interface, or any other suitable interface operable to assist in the communication of information to and/or from network 104. In some embodiments, system 100 can include a fourth communications link 120 operable to facilitate the communication of data between first mechanism 106 and second mechanism 108.

In the particular embodiment, first data collection mechanism 106 may be unable to continue interacting with client 102. In an alternative embodiment, a user of client 102 can interact with first mechanism 106 and/or second mechanism 108 until at least a first portion of data has been collected from a first user of one of clients 102. System 100 can, in some cases, operate to store the first portion of data in a memory accessible to both first mechanism 106 and second mechanism 108. In that example, system 100 can operate to cause first mechanism 106 and/or second mechanism 108 to initiate a second data collection process from a second user of one of clients 102. The second data collection process can be initiated by either first mechanism 106 or second mechanism 108.

In this example, system 100 also operates to collect a second portion of data from the second user using a second script. In some cases, system 100 can operate to store the second portion of data in the memory accessible to both first mechanism 106 and second mechanism 108.

In some embodiments, the first portion of data collected and stored by system 100 can be associated with the second user of one of clients 102 through network 104. In other embodiments, the first portion of data collected and stored by system 100 can be associated with the second user of one of clients 102 through an electronic mail system coupled to one of clients 102. In some cases, the first portion of data collected from the first client can serve as a basis for collecting additional information from a second client. In various embodiments, at least some of the first portion of data can be used to populate at least a portion of a second script associated with the second user of one of clients 102.

Figure 2:
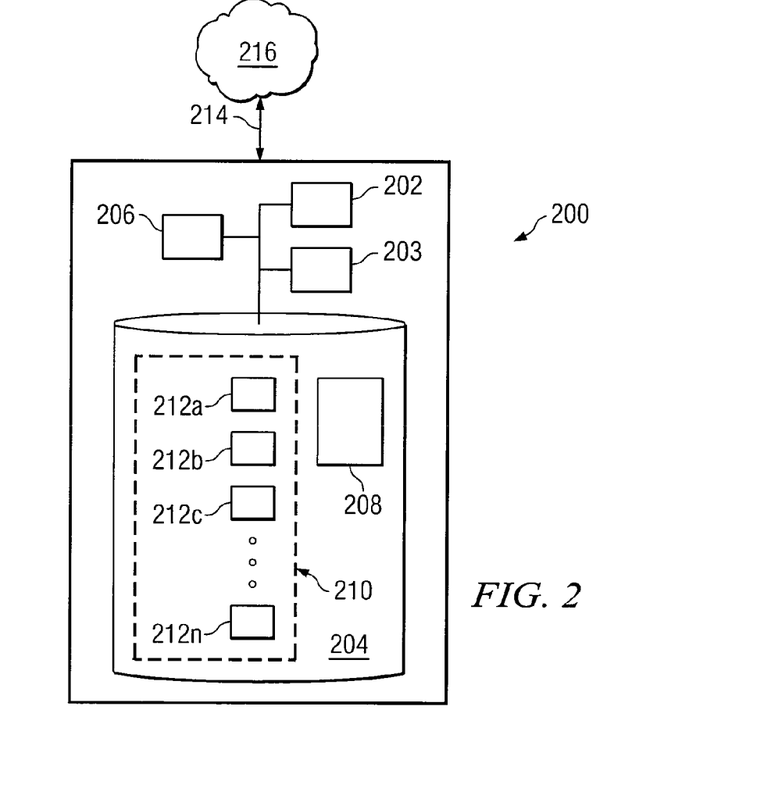
FIG. 2 is a block diagram of one embodiment of a data collection mechanism 200 capable of storing at least a portion of data collected from a user of a client.

FIG. 2 is a block diagram of one embodiment of a data collection mechanism 200 capable of storing at least a portion of the data collected from a user of a client. In some embodiments, the structure and function of data collection mechanism 200 can be substantially similar to first mechanism 106 or second mechanism 108 of FIG. 1. As non-limiting examples, data collection mechanism 200 could comprise an IVR system, an interactive web-based system, an agent-based system, or a combination these or other data collection systems. In this example, data collection mechanism 200 comprises at least an IVR system that enables mechanism 200 to interact with and collect data from a user.

In this example, data collection mechanism 200 includes a software engine 202 capable of processing the desired communicating and/or computing functionality associated with data collection mechanism 200. Although mechanism 200 includes only one software engine 202 in this example, any other number of software engines may be used without departing from the scope of the present disclosure. In some embodiments, software engine 202 includes or has access to a response cache 203 for storing data collected during a user's interaction with data collection mechanism 200. In other embodiments, software engine 202 includes or has access to response cache 203 for HTML rendering capabilities for dynamically generating web pages and/or database connectivity. In this particular embodiment, software engine 202 has access to a memory 204 capable of storing data 210 collected during a user's interaction with mechanism 200 and collected during the user's interaction with another data collection mechanism coupled to mechanism 200. Although this example depicts memory 204 as a single medium, memory 204 may comprise any additional number of storage media without departing from the scope of the present disclosure. Additionally, all or part of memory 204 could reside locally within data exchange mechanism 200 or could reside in a location remote from and accessible to data exchange mechanism 200.

Memory 204 is capable of storing one or more scripts 208 and data 210 associated with a user's response or responses to scripts 208 or to one or more scripts associated with another data collection mechanism. Memory 204 may include any hardware, software, firmware, or combination thereof operable to store and facilitate retrieval of information. Memory 204 may store information using any of a variety of data structures, arrangements, and/or compilations. Memory 204 may, for example, include a dynamic random access memory (DRAM), a static random access memory (SRAM), a NAND flash memory, or any other suitable volatile or nonvolatile storage and retrieval device or combination of devices.

In this example, data collection mechanism 200 also includes a voice recognition module 206 capable of processing voice responses, text-to-speech translations, and/or speech-to-text translations. Although mechanism 200 includes a software engine 202, a memory 204, and a speech recognition module 206 in this example, other devices may be included in mechanism 200 without departing from the scope of the present disclosure. Moreover, there is no request that each of software engine 202, memory 204 and speech recognition module 206 resides locally within mechanism 200 as shown in this example.

In this embodiment, software engine 202 processes one or more scripts 208 capable of being used to collect data from one or more users interfacing with data collection mechanism 200. In various embodiments, scripts 208 can be substantially similar to scripts 122 of FIG. 1. In one particular embodiment, scripts 208 include a common unitary script that enables software engine 202 to generate scripts for data collection mechanism 200 and other data collection mechanisms. For example, the common unitary script can be used to generate an IVR script for use by mechanism 200 and to generate an HTML-based script for use by an agent based data collection mechanism.

Scripts 208 may comprise, for example, software, firmware, code, portions of code, data compilations, and/or a combination of these or any other type of data. In this example, script 208 comprises an IVR script. Although software engine 202 processes an IVR script in this example, other scripting formats may be processed without departing from the scope of the present disclosure.

In this example, data collection mechanism 200 interacts with a client coupled to mechanism 200 using an IVR script to collect and store a first portion of data 212a on memory device 204. Although this example uses an IVR script to collect data, other scripting formats may be used without departing from the scope of the present disclosure. First data portion 212a may include, for example the queries presented to a client, the client's response or responses to those queries, or combination of these or other information associated with the client or script 208.

At some point in the process, for example after collecting first portion of data 212a from the client, the client may be associated with a second data collection mechanism. In one particular example, the second data collection mechanism may access to memory 204 store a second portion of data 212b being collected. In this specific example, second data portion 212b includes the client's responses to at least one query analogous to the last query presented by data collection mechanism 200 not yet presented by data collection mechanism 200. Additionally, second data portion 212b can include a user's response to the last query presented by data collection mechanism 200—the query that initiated the event.

In this example, the second data collection mechanism collects and communicates second data portion 212b to memory 204. In this example, memory 204 is accessible to the second data collection mechanism through a communication link 214 and/or a network 216. The structure and function of communication link 214 and network 216 can be substantially similar to communication link 116 and network 104, respectively. In an alternative embodiment, memory device 204 couples directly to the second data collection mechanism, such as, through a communication link substantially similar to communication link 120 of FIG. 1. In still other embodiments, memory 204, data collection mechanism 200 and the second data collection mechanism all reside locally to a single device.

In some embodiments, after collecting second data portion 212b from the client, the client can be associated back with data collection mechanism 200 to collect third portion of data 212c. The structure and function of third data portion 212c can be substantially similar to first data portion 212a. Although this example illustrates three data portions 212a, 212b, and 212c, any other number of data portions may be used without departing for the scope of the present disclosure.

In this example, collected data portions 212 associated with the client's interaction with one or more data collection mechanisms are stored in memory 204. Storing data portions 212 in a memory that is accessible to multiple data collection mechanisms can prove advantageous when it is desired to subsequently access and process this information. In some embodiments, data portions 212 can be used to populate script 208 and/or a script used by another data collection mechanism. Populating scripts with data portions 212 can help the data collection mechanisms interact more efficiently with a client. For example, populating a script used by a live agent or operator with data portions 212 allows the agent or operator to review the responses previously provided, which may allow the agent to better assist the client.

Figure 3A:
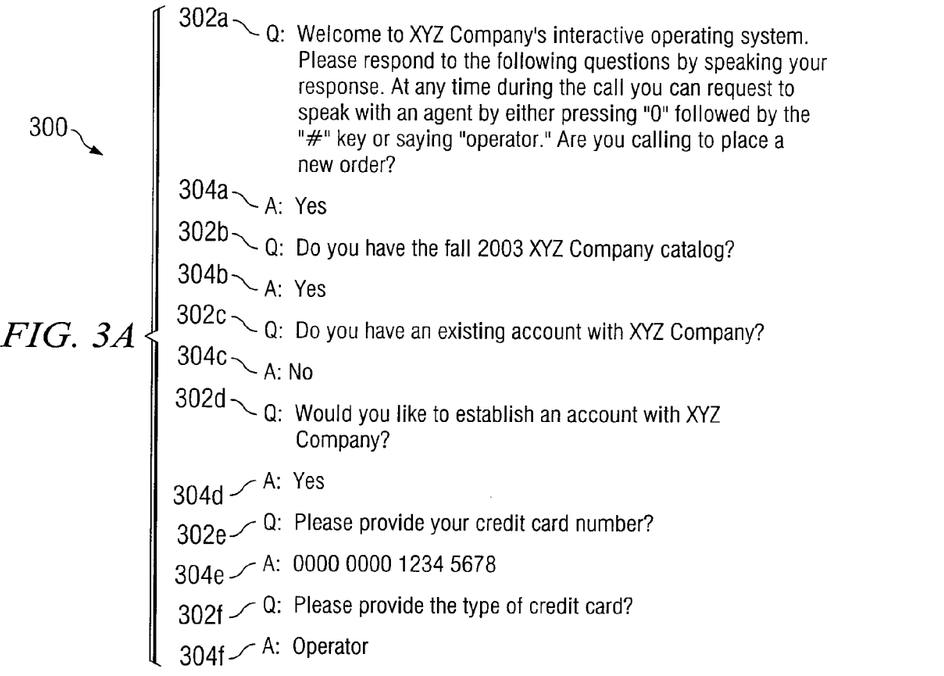
FIGS. 3a-3c are illustrative examples of queries associated with scripts capable of being used by a data collection mechanism.
Figure 3B:
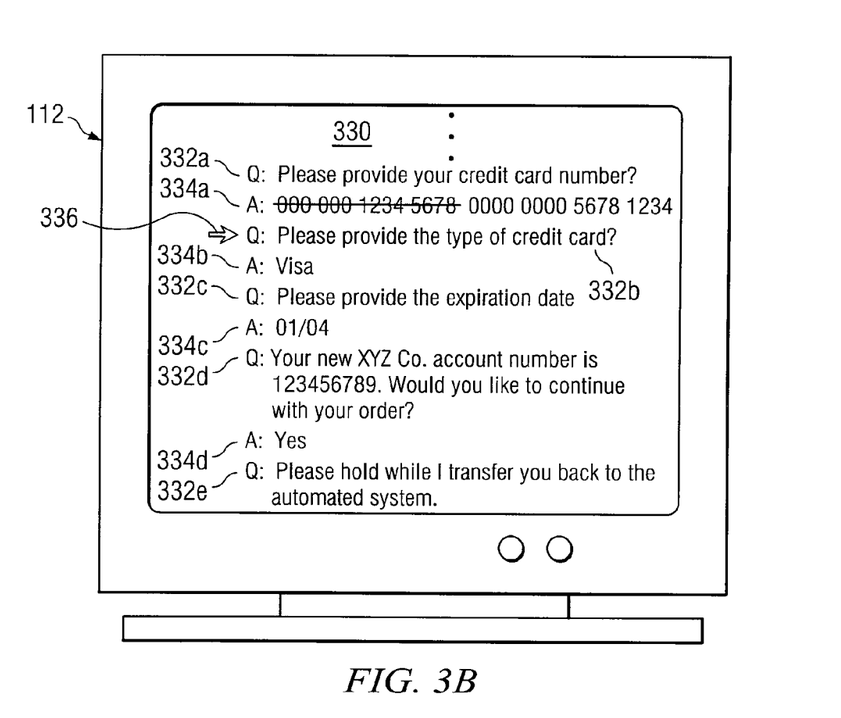
Figure 3C:
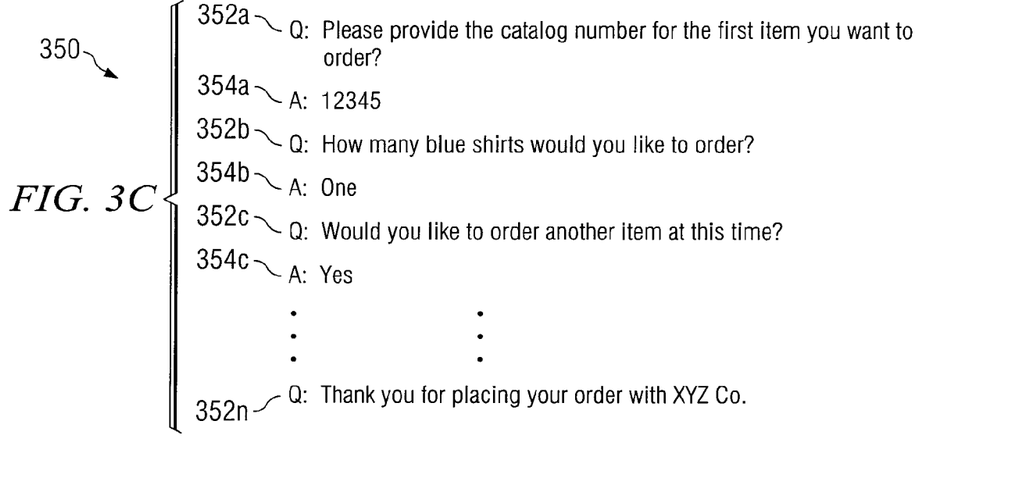

FIGS. 3A-3C are illustrative examples of queries associated with scripts capable of being used by a data collection mechanism. The particular queries illustrated in FIGS. 3A-3C are intended for exemplary purposes only and are not intended to limit the scope of the present disclosure. In addition, the particular queries are not intended to depict any particular scripting format and/or a scripting hierarchy. In one particular embodiment, one or more data collection mechanisms may use at least some of the illustrated queries to collect data from a user of a data collection system, such as system 100 of FIG. 1. Although system 100 is used in this example, other systems may be used without departing from the scope of the present disclosure. In this embodiment, a user of system 100 initiates the data collection process by using a client 102 to connect to first data collection mechanism 106. In an alternative embodiment, first mechanism 106 can initiate the process with client 102

FIG. 3A illustrates one example of a series of queries 302 associated with a script 300 capable of being used by first data collection mechanism 106 of FIG. 1 to collect data from client 102. In this example, script 300 comprises an IVR script that enables first data collection mechanism 106 to interact with and collect data from a user of client 102. Although an IVR script is used in this example, other scripting formats may be used without departing from the scope of the present disclosure.

In this example, first mechanism 106 has presented queries 302a-302f and has collected responses 304a-304f from the user of client 102. Although six queries are presented in this example, any other number of queries may be presented without departing from the scope of the present disclosure. In this particular example, a user of client 102 interacts with first mechanism 106 by "speaking" a response 304 to the queries 302 presented by first mechanism 106. Although a user "speaks" his responses in this example, a user may respond by other response mechanisms without departing from the scope of the present disclosure. In this example, first mechanism 106 stores each response 304 in a memory accessible to first mechanism 106.

In this embodiment, first mechanism 106 is unable to continue interacting with the user of client 102 due to an event associated with the interaction of the user of client 102 and mechanism 106. In this particular embodiment, that event comprises the user of client 102 requesting to speak with a live agent at response 304f. In alternative embodiments, that event may comprise, for example, the user not responding to the query within a given period, a user providing an inappropriate response to a query or any other event that may indicate that the user needs assistance or otherwise desires to use another mechanism. In some cases, the user of client 102 can be associated between first mechanism 106 and second mechanism 108 merely to ensure that business objectives, such as consumer satisfaction, are met. In this particular embodiment, once the event occurs, first mechanism 106 generates an agent assistance signal and communicates that signal to one of second mechanisms 108. After first mechanism 106 collects and stores the user's responses 304a-304f, the user of client 102 is associated with one of second data collection mechanisms 108.

FIG. 3B illustrates one example of a series of queries 332 associated with a script 330 capable of being used by second data collection mechanism 108 of FIG. 1 to collect data from client 102. In this example, script 330 comprises an HTML-based script that enables an agent using second data collection mechanism 108 to interact with and collect data from the user of client 102. Although an HTML-based script is used in this example, any other scripting format may be used without departing from the scope of the present disclosure.

In this example, a live agent using second mechanism 108 has presented queries 332a-332d and retrieved, collected, entered, and/or amended responses 334a-334d from the user of client 102. In particular, an agent using second mechanism 108 has amended the user's response 334a to query 332a and has collected responses 334b-334d to queries 332b-332d. Although four queries have been presented in this example, any other number of queries may be presented without departing from the scope of the present disclosure. In this particular example, a user of client 102 interacts with second mechanism 108 by "speaking" a response 334 to the queries 332 presented by second mechanism 108. In this example, second mechanism 108 stores each response 334 in a memory device accessible to second mechanism 108.

In this particular embodiment, script 330 includes at least the last query presented by first mechanism 106 and at least one query not presented by first mechanism 106. In other embodiments, script 330 can include all the queries presented by first mechanism 106. In this example, script 330 includes at least some of the same queries 332a and 332b presented by script 300 of FIG. 3A. Although script 330 includes the same queries presented by script 300, analogous queries capable of collecting substantially similar information could be used without departing from the scope of the present disclosure. That is, one or more queries 332 associated with script 330 can be directed toward collecting the same or similar information collected using script 300.

In this particular embodiment, script 330 includes at least some of the data collected using script 300 of FIG. 3A. That is, at least some of the data collected using script 300 is used to populate at least a portion of script 330. In an alternative embodiment, script 330 can include other user information stored in a memory device accessible to first mechanism 106 and second mechanism 108. For example, script 330 can include a user's account number, a user's credit card information, or any other information previously collected by first and/or second data collection mechanisms. In this example, script 330 includes an indicator 336 capable of identifying to an agent using second mechanism 108 the point in script 300 where the agent assistance signal was generated.

In this embodiment, after second mechanism 108 collects and stores the user's responses 334a-334d, an agent using second mechanism 108 associates the user of client 102 back with first mechanism 106 to further collect data from the user.

In other embodiments, an agent using second mechanism 108 could associate the user of client 102 with another one of second mechanisms 108. In an alternative embodiment, the user of client 102 could interact with the agent associated with second mechanism 108 until all desired information has been collected from the user.

FIG. 3C illustrates one example of a series of queries 352 associated with a script 350 capable of being used by first data collection mechanism 106 of FIG. 1 to collect data from client 102. In this example, script 350 comprises an IVR script used by first data collection mechanism 106 to interact with and collect data from the user of client 102. Although an IVR script is used in this example, any other scripting format may be used without departing from the scope of the present disclosure.

In this example, first mechanism 106 has presented queries 352a-352n and has collected at least responses 354a-354c from the user of client 102. In this particular example, a user of client 102 interacts with first mechanism 106 by "speaking" a response 354 to the queries 352 presented by first mechanism 106. Although a user "speaks" his responses in this example, a user may respond by any other response mechanism without departing from the scope of the present disclosure. In this example, first mechanism 106 stores each response 354 in a memory accessible to first mechanism 106.

In this particular example, the user of client 102 will interact with first data collection mechanism 106 using script 350 until the remaining data has been collected from the user, or until an event occurs that triggers an association with another mechanism. In alternative embodiments, the user of client 102 can be associated between first mechanism 106 and second mechanism 108, as needed, until the remaining data has been collected from the user. In some cases, the user of client 102 can be associated between first mechanism 106 and second mechanism 108 to ensure that business objectives, such as consumer satisfaction, are satisfied.

Figure 4A:
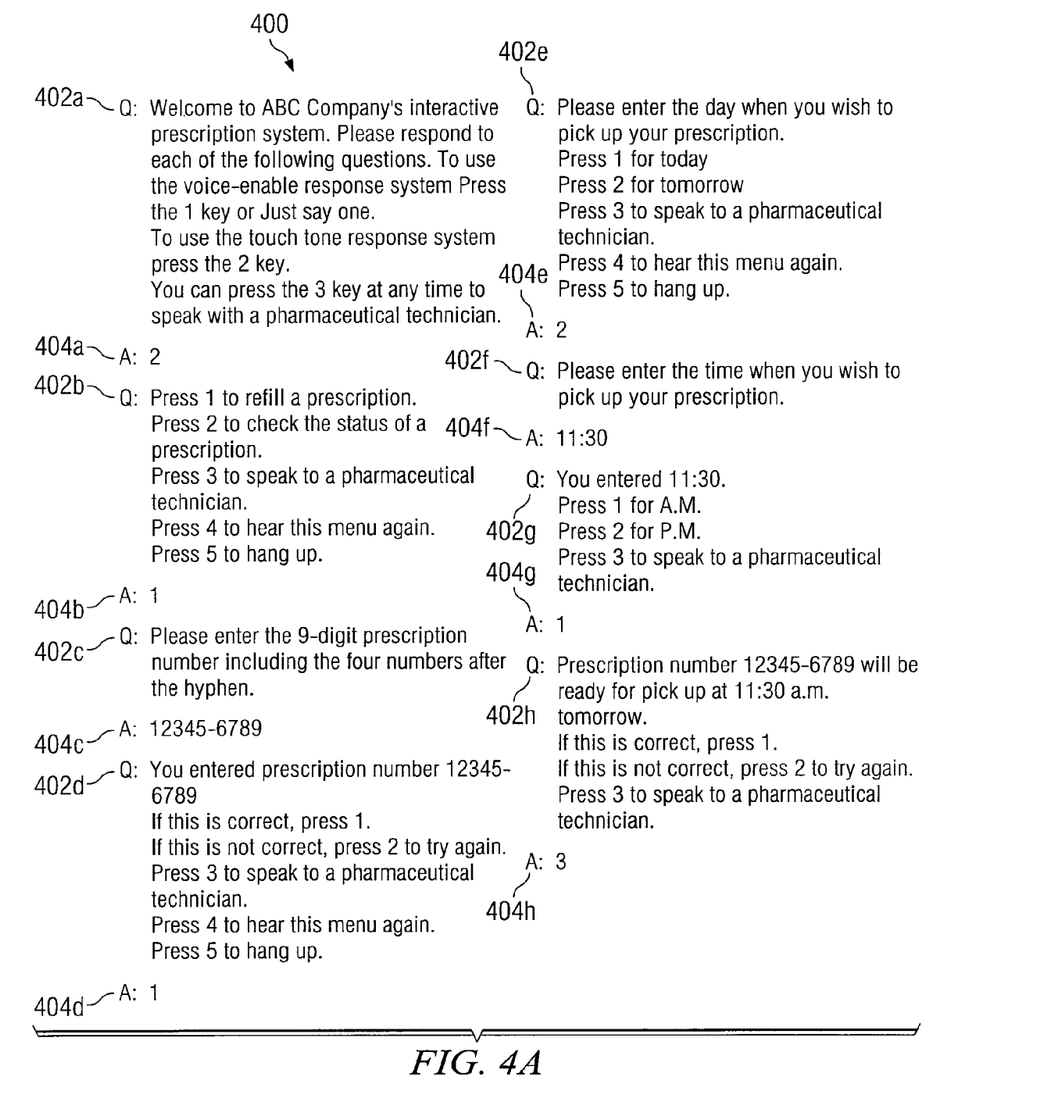
FIGS. 4a-4b are illustrative examples of queries associated with scripts capable of being used by a data collection mechanism.
Figure 4B:
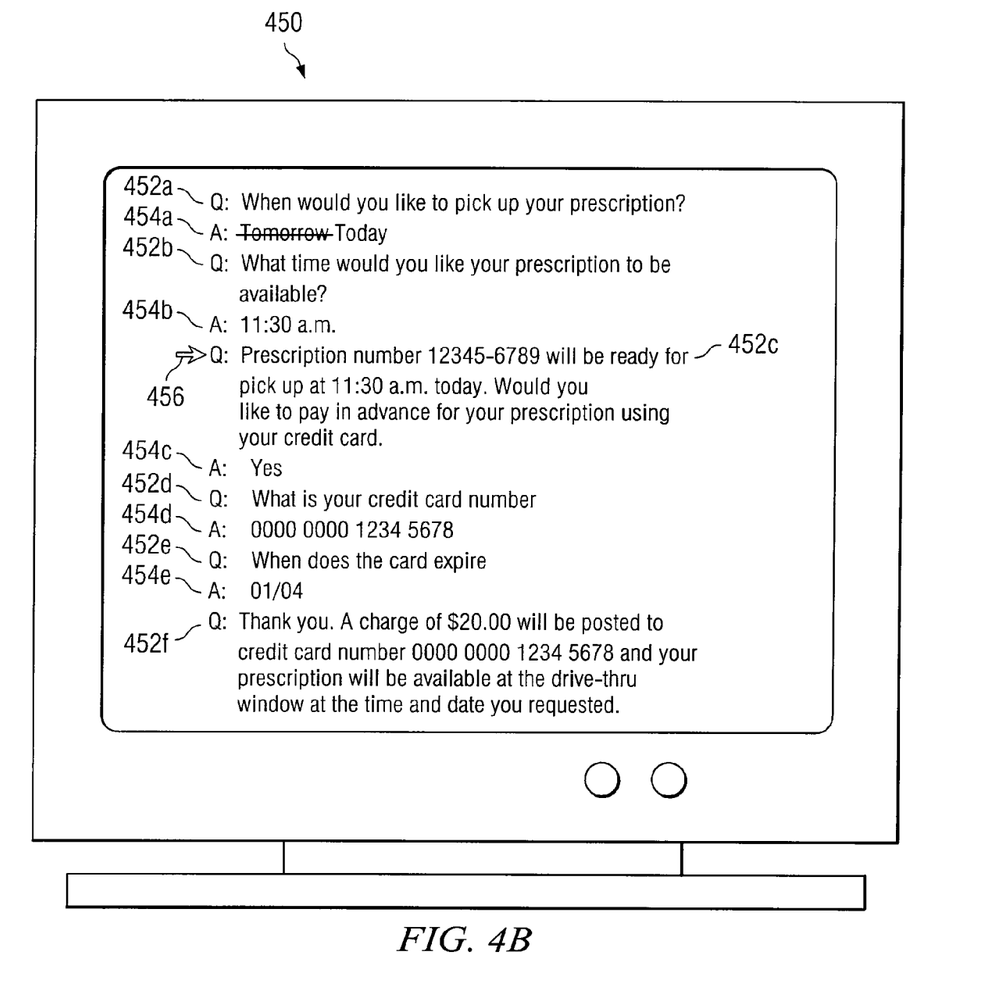

FIGS. 4A-4B are illustrative examples of queries associated with scripts capable of being used by a data collection mechanism. The particular queries illustrated in FIGS. 4A-4B are intended for exemplary purposes only and are not intended to limit the scope of the present disclosure. In addition, the particular queries are not intended to depict any particular scripting format and/or a scripting hierarchy. In one particular embodiment, one or more data collection mechanisms may use at least some of the queries to collect data from a user of a data collection system, such as system 100 of FIG. 1. Although system 100 is used in this example, other systems may be used without departing from the scope of the present disclosure. In this embodiment, a user of system 100 initiates the data collection process by using a client 102 to connect to first data collection mechanism 106. In an alternative embodiment, first mechanism 106 can initiate the process with client 102.

FIG. 4A illustrates one example of a series of queries 402 associated with a script 400 capable of being used by first data collection mechanism 106 of FIG. 1 to collect data from client 102. In this example, script 400 comprises an IVR script that enables first data collection mechanism 106 to interact with and collect data from a user of client 102. Although an IVR script is used in this example, other scripting formats may be used without departing from the scope of the present disclosure.

In this example, first mechanism 106 has presented queries 402a-402h and has collected responses 404a-404h from the user of client 102. Although eight queries have been presented in this example, any other number of queries may be presented without departing from the scope of the present disclosure. In this particular example, a user of client 102 interacts with first mechanism 106 by "keying" a response 404 to the queries 402 presented by first mechanism 106. Although a user "keys" his responses in this example, a user may respond by other response mechanisms without departing from the scope of the present disclosure. In this example, first mechanism 106 stores each response 404 in a memory device coupled to first mechanism 106.

In this embodiment, first mechanism 106 discontinues interacting with the user of client 102 due to an event associated with the interaction of the user of client 102 and mechanism 106. In this particular embodiment, that event comprises the user of client 102 requesting to speak with a live agent at response 404h. In alternative embodiments, that event may comprise, for example, the user not responding to the query within a given period or any other event that may indicate that the user needs assistance or otherwise desires to use another mechanism. In some cases, the user of client 102 can be associated between first mechanism 106 and second mechanism 108 merely to ensure that business objectives, such as consumer satisfaction, are satisfied. In this particular embodiment, once the event occurs, first mechanism 106 generates an agent assistance signal and communicates that signal to one of second mechanisms 108. In response to the agent assistance signal, system 100 associates client 102 with one of second data collection mechanisms 108.

FIG. 4B illustrates one example a series of queries 452 associated with a script 450 capable of being used by second data collection mechanism 108 of FIG. 1 to collect data from client 102. In this example, script 450 comprises an HTML-based script that enables a live agent using second data collection mechanism 108 to interact with and collect data from the user of client 102. Although an HTML-based script is used in this example, any other scripting format may be used without departing from the scope of the present disclosure.

In this example, an agent using second mechanism 108 has presented queries 452a-452f and retrieved, collected, entered, and/or amended responses 454a-454e from the user of client 102. In particular, an agent using second mechanism 108 has amended the user's response 454a to query 452a and has collected responses 454b-454e to queries 452b-452e. Although six queries have been presented in this example, any other number of queries may be presented without departing from the scope of the present disclosure. In this particular example, a user of client 102 interacts with second mechanism 108 by "speaking" a response 454 to the queries 452 presented by second mechanism 108. In this example, second mechanism 108 stores each response 454 in a memory accessible to second mechanism 108.

In this particular embodiment, script 450 includes at least the last query presented by first mechanism 106. In other embodiments, script 450 can include all the queries presented by first mechanism 106 and at least one query not presented by first mechanism 106. In this example, script 450 includes at least some queries 452a-452c that are analogous to queries presented by script 400 of FIG. 4A. That is, queries 452a-452c are directed toward collecting the same or substantially similar information as queries 402e-402h of FIG. 4A.

In this particular embodiment, script 450 includes at least some of the data collected using script 400 of FIG. 4A. That is, at least some of the data collected using script 400 is used to populate at least a portion of script 450. In an alternative embodiment, script 450 can include other user information stored in a memory accessible to first mechanism 106 and second mechanism 108. For example, script 450 can include a user's account number, a user's credit card information, or any other information previously collected by first and/or second data collection mechanisms. In this example, script 450 includes an indicator 456 capable of identifying to an agent using second mechanism 108 the point in script 400 where the agent assistance signal was generated.

In this particular example, the user of client 102 will interact with the agent associated with second mechanism 108 using script 450 until the remaining data and/or information has been collected from the user. In alternative embodiments, an agent using second mechanism 108 can associate the user of client 102 back with first mechanism 106 to further collect data from the user.

Although the examples shown in FIGS. 3 and 4 involved associating between an IVR mechanism and a live-operator mechanism, the disclosed methods could equally apply to associating calls between any combination of a web-based mechanism, an IVR mechanism, a live-operator mechanism, or other information collection mechanisms.

Figure 5:
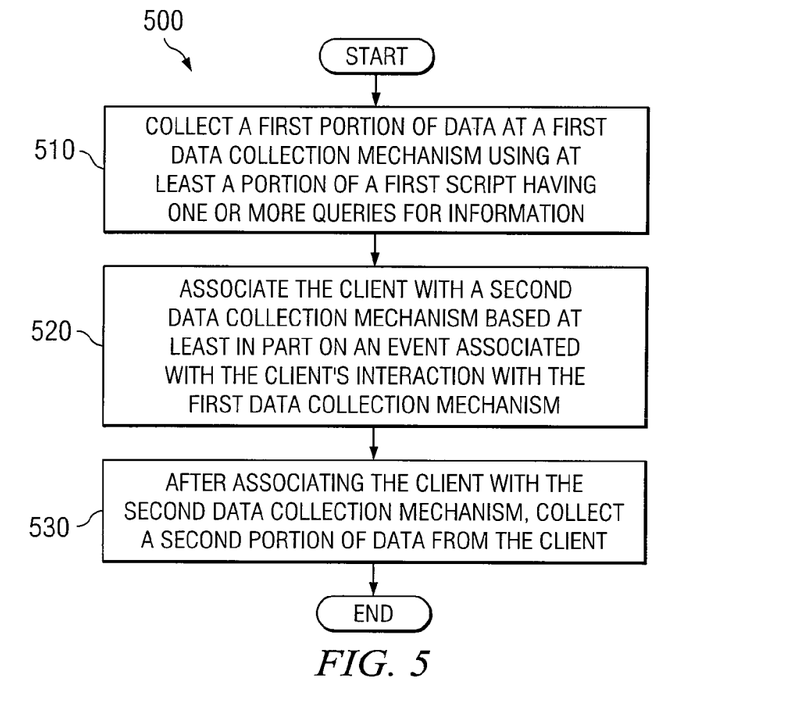
FIG. 5 is a flow chart illustrating an exemplary method for providing data collection from a client at a data collection mechanism.

FIG. 5 is a flow chart illustrating an exemplary method for providing data collection from a client at a data collection mechanism. In one particular embodiment, data maybe collected from a client at a data collection mechanism through system 100 of FIG. 1. Although system 100 is used in this example, other systems may be used without departing from the scope of the present disclosure. In this embodiment, a user of system 100 has initiated the data collection process by using a computing and/or communication device to connect to first data collection mechanism 106; alternatively, first mechanism 106 has initiated the process with client 102.

In this example, method 500 begins at step 510 where a first mechanism 106 collects at least a first portion of data using script 122 having one or more queries for information. A user of client 102 can interact with first mechanism 106 by speaking, keying, or otherwise giving responses to the queries associated with script 122. In various embodiments, first mechanism 106 collects and stores each response in a memory accessible to first mechanism 106. As a specific embodiment, the structure and function of the memory can be substantially similar to memory 204 of FIG. 2.

In this example, after first mechanism 106 collects and stores at least a portion of data from client 102, first mechanism 106 discontinues its interaction with client 102 due to an event associated with the interaction of client 102 and first mechanism 106. In some embodiments, first mechanism 106 generates an assistance signal in response to the event associated with client 102. Script 122 may be marked at the query where the assistance signal was generated. Marking the query of script 122 where the assistance signal was generated can help second data collection mechanism 108 to more efficiently assist client 102.

The user of client 102 is associated with second mechanism 108 at step 520 based at least in part on the event associated with the interaction of client 102 and first mechanism 106. In some embodiments, some or all of the data collected using script 122 are associated with second mechanism 108. Second mechanism 108 collects at least a second portion of data from the user of client 102 at step 530. In this example, second mechanism 108 collects data from client 102 using a script. In various embodiments, the script associated with second mechanism 108 enables the processing, collection, entering, and/or storing of the data received from client 102.

In this example, the queries associated with the script processed by second mechanism 108 include at least one query that has not yet been presented to client 102 by first mechanism 106. In some cases, the script used by second mechanism 108 can be substantially similar to at least some of the queries associated with script 122. In other embodiments, the script executed by second mechanism 108 may be identical to the script executed by first mechanism 106. In still other cases, the scripts executed by mechanisms 106 and 103 may be wholly distinct. In some cases, it may be desirable to also include in the script executed by second mechanism 108 at least some of the responses collected from client 102 in the script used by first mechanism 106. In various embodiments, at least some of the data collected by first mechanism 106 is used to populate at least a portion of the script used by second mechanism 108.

In this example, second mechanism 108 interacts with client 102 by requesting that client 102 respond to one or more queries associated with the script used by second mechanism 108. In some cases, second mechanism 108 presents at least the query last presented by first mechanism 106. Additionally, second mechanism 108 can seek information responsive to at least a query not presented by first mechanism 106. A user of client 102 can interact with second mechanism 108 by speaking, keying, or otherwise indicating responses to one or more queries associated with the script used by second mechanism 108. In various embodiments, second mechanism 108 communicates the data collected from client 102 to a memory accessible to second mechanism 108. In some embodiments, the data collected by second mechanism 108 can be stored on a common memory device accessible to both first mechanism 106 and second mechanism 108.

In some embodiments, after collecting a second portion of data at second mechanism 108, client 102 and/or the data is associated with first mechanism 106 to collect another portion of data from client 102 using script 122. In various embodiments, the data collected using the script associated with second mechanism 108 can be used to populate at least a portion of script 122 used by first mechanism 106.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A method for providing data collection from multiple clients, the method comprising:
    collecting from a first client a portion of data using a data collection system and using at least a portion of a first script comprising one or more queries for information to the first client;
    using the data collection system, automatically associating the first portion of data with a second client; and
    using the data collection system, automatically populating at least a portion of a second script with at least some of the first portion of data collected from the first client, the second script comprising one or more queries for information to the second client;
    collecting from the second client a second portion of data using the second script and the data collection system.

2. The method of claim 1, wherein the data collection system comprises one or more data collection mechanisms selected from the group consisting of an interactive voice response system, and an interactive web-based system.

3. The method of claim 1, wherein the first portion of data is collected from the first client using a first data collection device mechanism of the data collection system; and
    wherein the second portion of data is collected from the second client using a second data collection mechanism of the data collection system.

4. The method of claim 1,
wherein the first portion of data is collected from the first client using a first data collection mechanism of the data collection system;
wherein the second portion of data is collected from the second client using a second data collection mechanism of the data collection system; and
wherein each of the first data collection mechanism and the second data collection mechanism are selected from the group consisting of an interactive voice response system and an interactive web-based system.

5. The method of claim 1, further comprising:
storing the first portion of data and the second portion of data in computer-readable memory accessible to a first data collection mechanism of the data collection system and a second data collection mechanism of the data collection system,
wherein the first portion of data is collected from the first client using the first data collection mechanism of the data collection system; and
wherein the second portion of data is collected from the second client using the second data collection mechanism of the data collection system.

6. The method of claim 1, wherein the first portion of data is collected from the first client using a first data collection mechanism of the data collection system; and
wherein the second portion of data is collected from the second client using the second data collection mechanism of the data collection system, the second data collection mechanism initiating the collection of the second portion of data from the second user.

7. The method of claim 1, wherein the first portion of data is collected from the first client using a first data collection mechanism of the data collection system; and
wherein the second portion of data is collected from the second client using a second data collection mechanism of the data collection system, the second portion of data comprising answers of the second client in response to queries of the second data collection mechanism.

8. The method of claim 1, wherein the first script is selected from the group consisting of an HTML-based script and an interactive voice response script.

9. The method of claim 1, wherein the second script is selected from the group consisting of an HTML-based script and an interactive voice response script.

10. The method of claim 1, wherein the first portion of data is associated with the second client through an electronic mail system.

11. The method of claim 1, wherein the first portion of data is collected from the first client using a data collection mechanism of the data collection system; and
wherein the data collection mechanism initiates the collection of the first portion of data from the first user.

12. The method of claim 1, wherein the first portion of data is collected from the first client using a data collection mechanism of the data collection system; and
wherein the data collection mechanism initiates the collection of the second portion of data from the second user.

13. The method of claim 1, wherein the second script comprises at least one query for information, the at least one query of the second script is not presented to the first client by the first script.

14. The method of claim 1, further comprising:
using the data collection system, automatically populating at least a portion of the second script with at least some of the first portion of data, the first portion of data comprising one or more answers of the first client associated with one or more queries presented by the first script.

15. A data collection system capable of providing data collection from multiple clients, the data collection system comprising:
a first data collection mechanism configured to automatically collect a first portion of data from a first client during a first communication session using at least a portion of a first script comprising one or more queries for information to the first client; and
a second data collection mechanism configured to:
automatically collect a second portion of data from a second client during a second communication session; and
automatically associate the first portion of data collected from the first client during the first communication with the second client; and
automatically populate at least a portion of a second script with at least some of the first portion of data collected from the first client, the second script comprising one or more queries for information to the second client.

16. The system of claim 15, wherein the first portion of data and the second portion of data are stored in computer-readable memory accessible to the first and second data collection mechanisms.

17. The system of claim 15, wherein the first portion of data is associated with the second client through an electronic mail system.

18. The system of claim 15, wherein the second data collection mechanism initiates the collection of the second portion of data from the second user.

19. A method for providing data collection from multiple clients, the method comprising:
collecting from a first client a first portion of data during a first communication session, the collecting of the first portion of data using a data collection system and the data collection system using at least a portion of a first script comprising one or more queries for information to the first client;
associating the first portion of data with a second client; and
automatically populating at least a portion of a second script with at least some of the first portion of data collected from the first client, the second script comprising one or more queries for information to the second client;
collecting from the second client a second portion of data client during a second communication session, the collecting of the second portion of data using the data collection system and the second script comprising one or more queries for information to the second client.

20. The method of claim 19, wherein the first portion of data and the second portion of data are stored in computer-readable memory of the data collection system.

* * * * *